United States Patent [19]

Klaren

[11] 4,292,135

[45] Sep. 29, 1981

[54] MULTISTAGE-EXPANSION EVAPORATOR

[75] Inventor: Dick G. Klaren, Hillegom, Netherlands

[73] Assignee: Gustav Adolf Pieper, Heemstede, Netherlands

[21] Appl. No.: 81,142

[22] Filed: Oct. 2, 1979

Related U.S. Application Data

[63] Continuation of Ser. No. 875,565, Feb. 6, 1978, abandoned, which is a continuation of Ser. No. 685,180, May 11, 1976, abandoned.

[30] Foreign Application Priority Data

May 20, 1975 [NL] Netherlands ..................... 7505869

[51] Int. Cl.³ ........................... B01D 1/30; B01D 3/06
[52] U.S. Cl. ................................ 202/173; 202/185 R; 202/180; 159/18; 203/11
[58] Field of Search ............... 202/173, 174, 185 R, 202/180; 203/73, 11, DIG. 17, 88, 1; 159/18

[56] References Cited

U.S. PATENT DOCUMENTS

| | | | |
|---|---|---|---|
| 3,172,824 | 3/1965 | Mulford | 202/173 |
| 3,312,601 | 4/1967 | Wilson | 202/173 |
| 3,431,179 | 3/1969 | Starmer | 202/173 |
| 3,444,049 | 5/1969 | Starmer et al. | 202/173 |
| 3,476,655 | 11/1969 | Sieder | 202/173 |
| 3,522,152 | 7/1970 | Osdor | 202/173 |
| 3,558,439 | 1/1971 | Anderson | 202/173 |

*Primary Examiner*—Wilbur L. Bascomb, Jr.
*Attorney, Agent, or Firm*—Stevens, Davis, Miller & Mosher

[57] ABSTRACT

A vertical multistage expansion evaporator comprising contiguous vertically arranged evaporator compartments, passages permitting communication between contiguous compartments and flow control apparatus positioned at each passage which is adjustable simultaneously by a single adjusting operation from outside the compartments. The contiguous compartments have a common ceiling and floor defining a passage therebetween. Each compartment further comprises a vertical separating wall extending partially the distance from the floor to the ceiling to divide the compartment into liquid and vapor sections so that liquid in the bottom of one compartment flows into the vapor section of the compartment next below.

5 Claims, 9 Drawing Figures

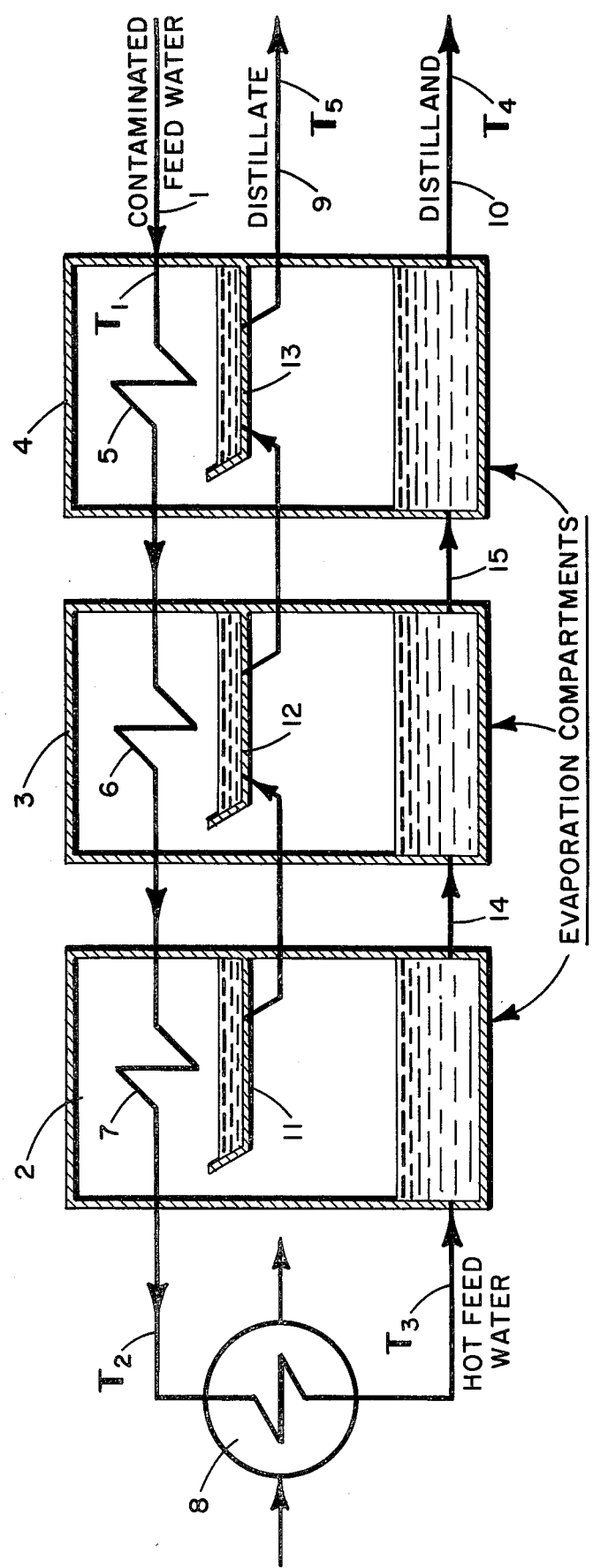
FIG.1 *PRIOR ART*

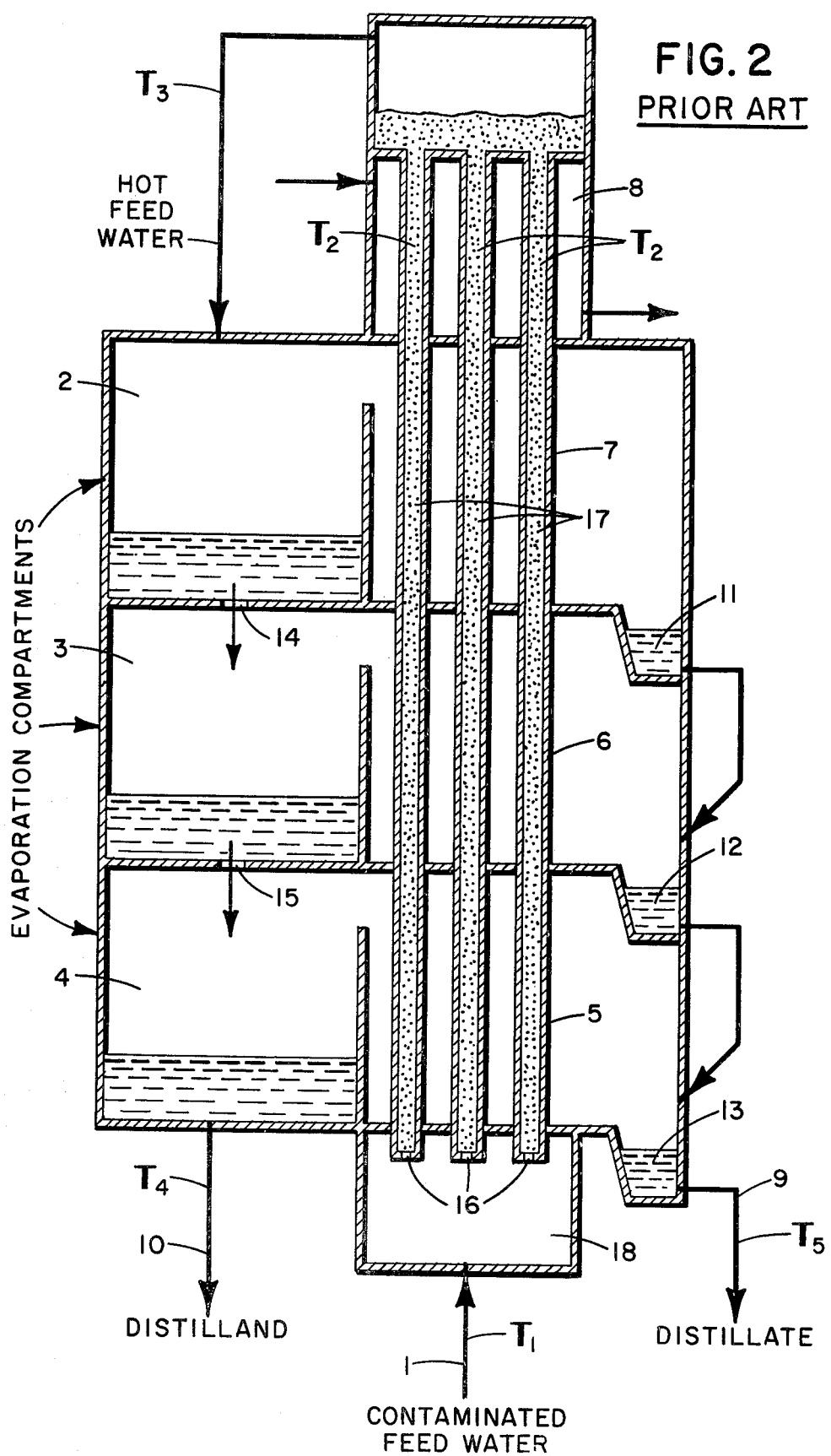

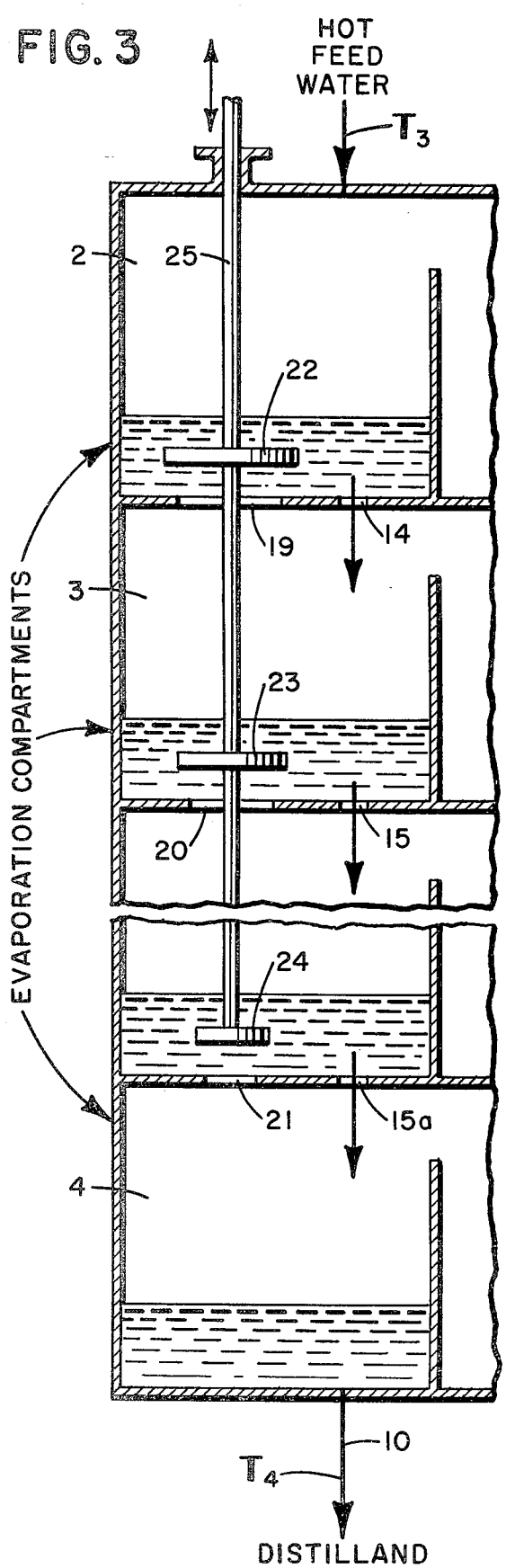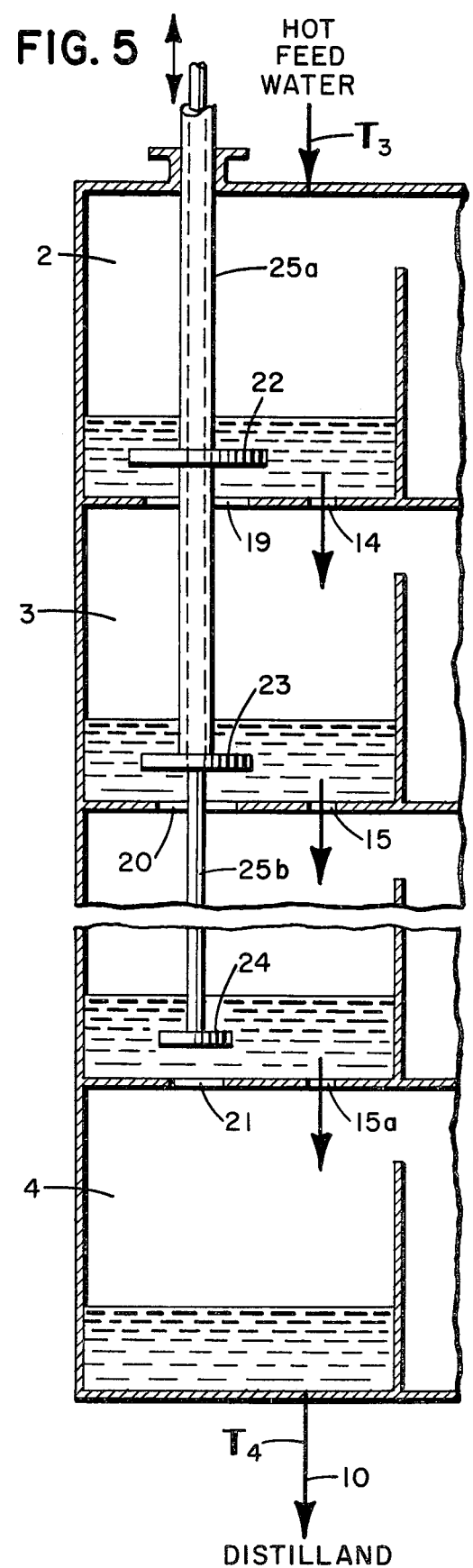

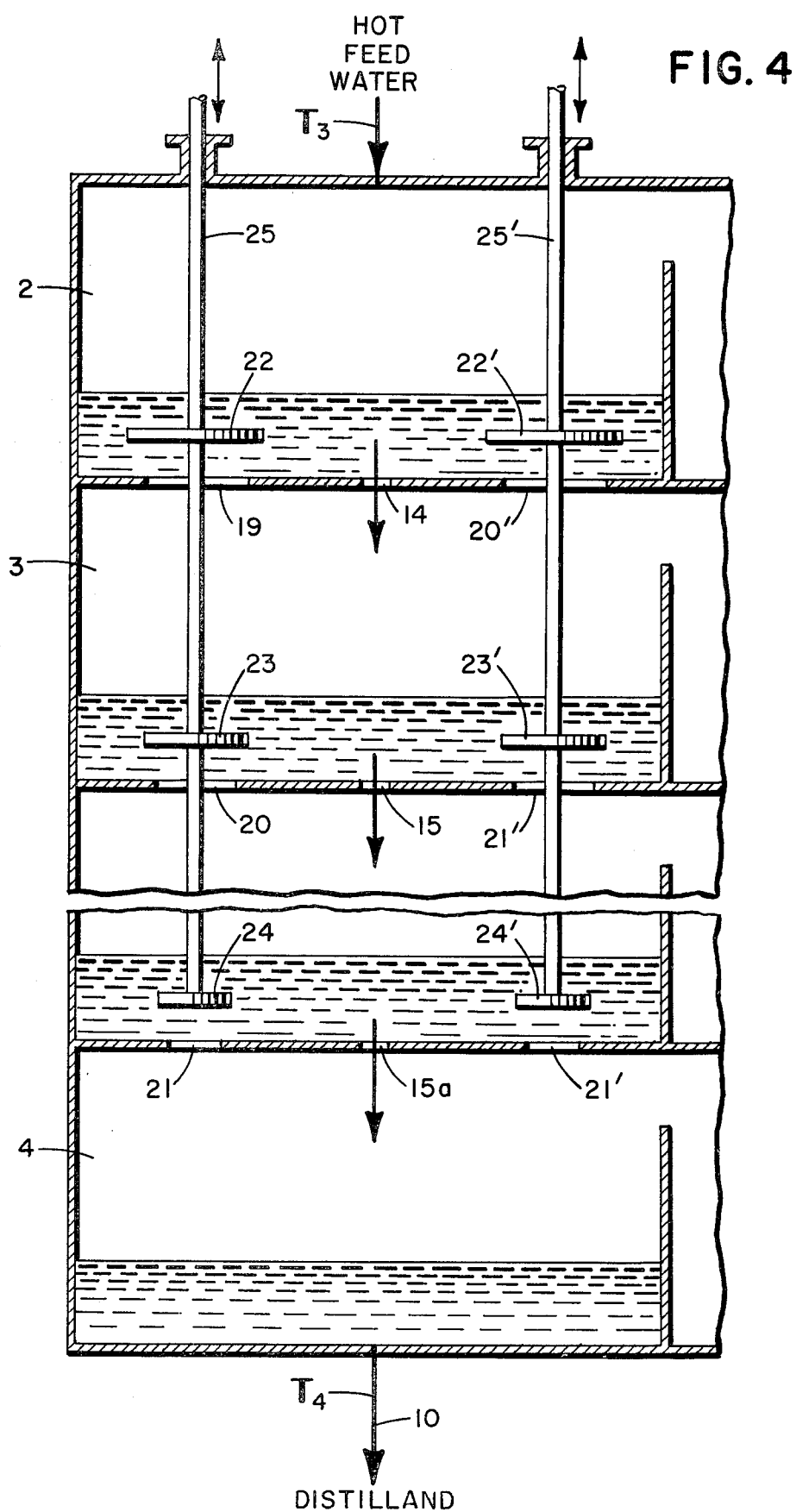

MULTISTAGE-EXPANSION EVAPORATOR

This is a continuation of application Ser. No. 875,565, filed Feb. 6, 1978 which in turn is a continuation of application Ser. No. 685,180, filed May 11, 1976, both now abandoned.

The invention relates to a multistage expansion evaporator with evaporating compartments which have been built together in series to form a unit, with a throttle opening in each separating wall between a prior and a subsequent flow through evaporator compartment, near the bottom of the preceding evaporating compartment. Expansion evaporators are often applied for the production of a pure distillate from brackish water, seawater, or of contaminated water in general.

FIGS. 1 and 2 are schematic views of prior art embodiments of multistage expansion evaporators in horizontal and vertical configurations respectively;

FIGS. 3, 4 and 5 are views similar to FIG. 2; with the heat exchanger tubes 17 and associated parts omitted for the sake of simplicity; and illustrating the principles of this invention;

Figure 6:
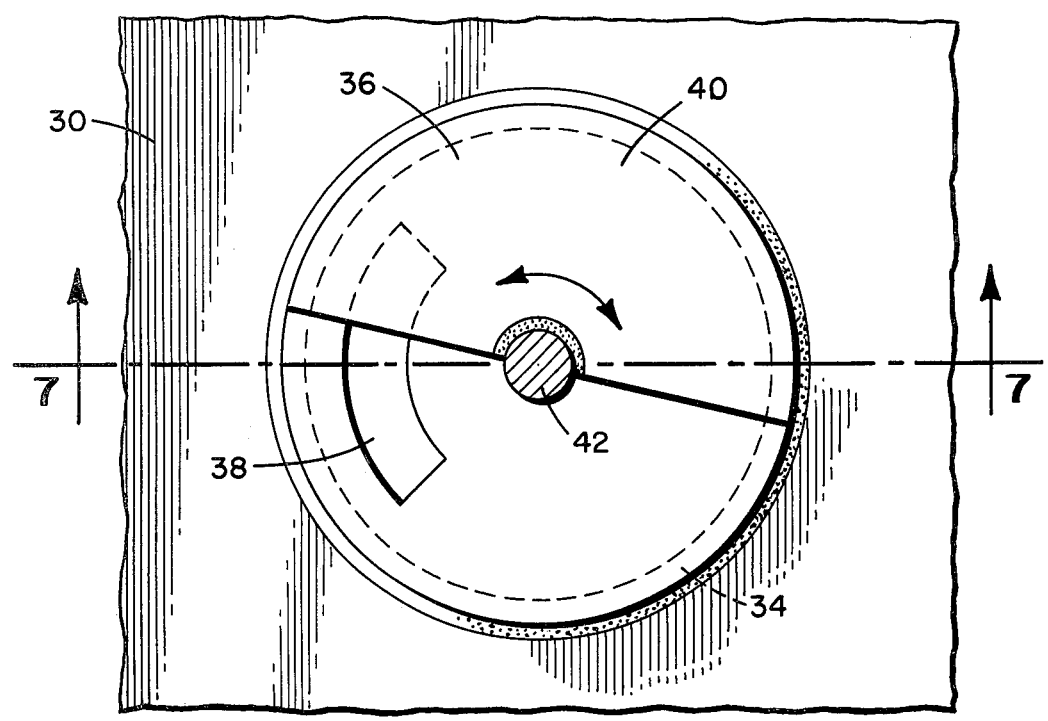
Figure 7:
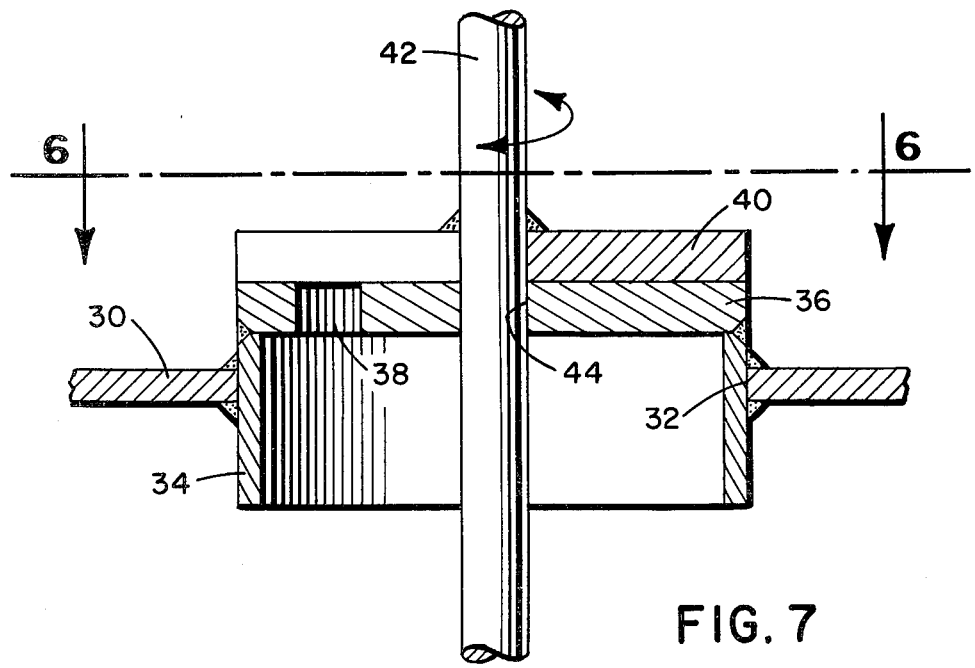
Figure 8:
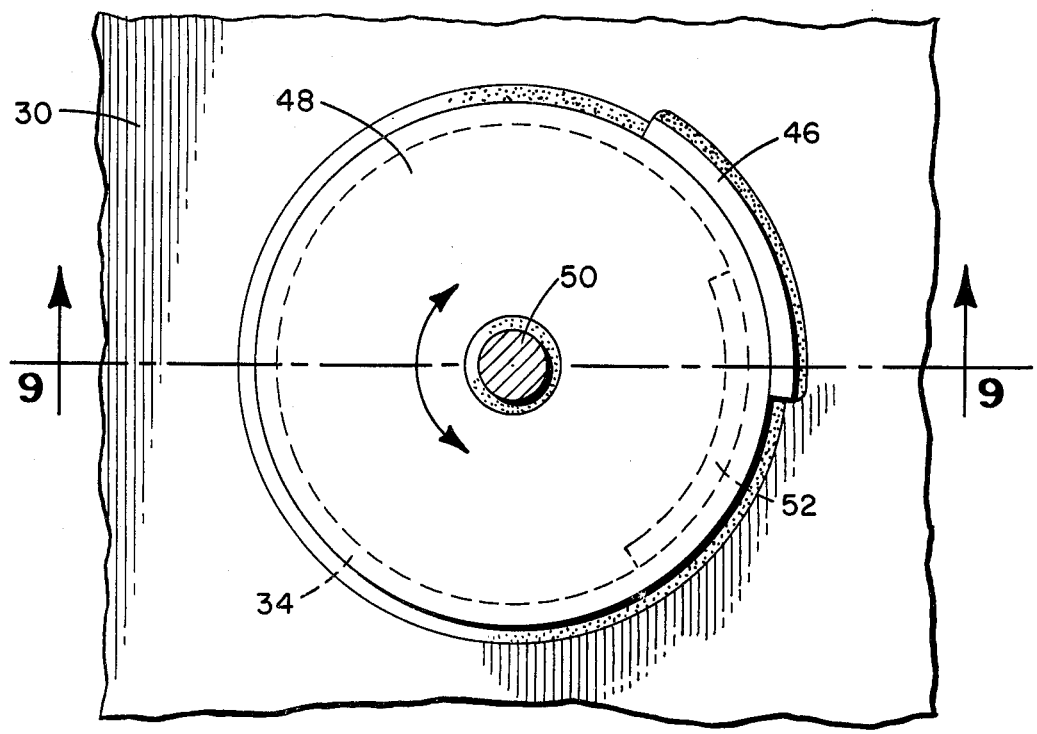
Figure 9:
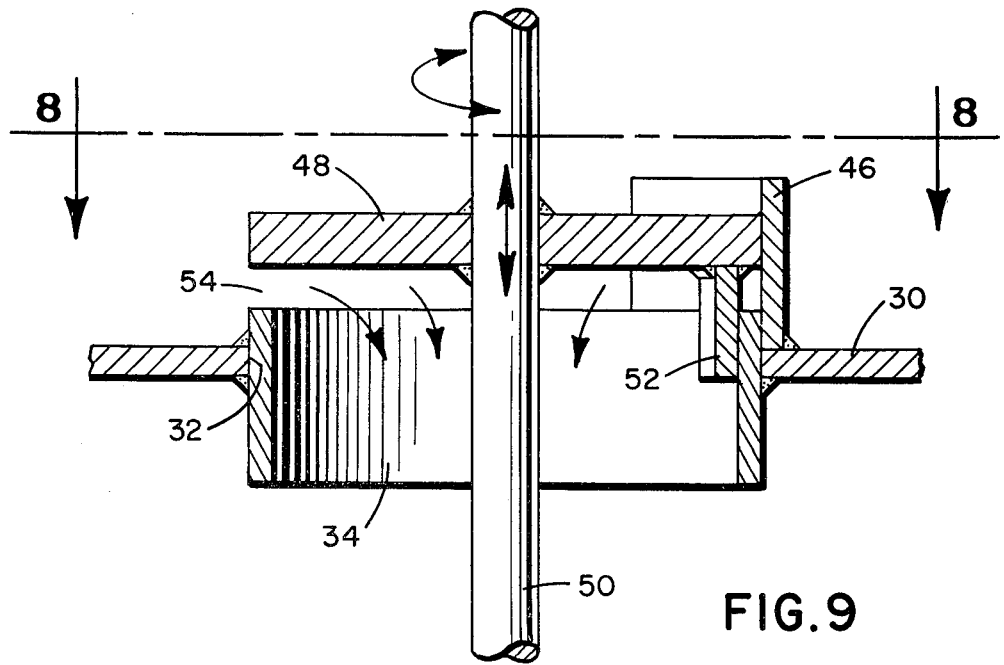

FIGS. 6 and 7 are top plan and cross-sectional views of a modified evaporation compartment throttle valve taken along lines 6—6 and 7—7 of the respective Figures; and FIGS. 8 and 9 are top plan and cross-sectional views of another modification of a throttle valve taken along lines 8—8 and 9—9 of the respective Figures.

FIG. 1 is a prior art schematic of the principle of such an evaporator in a horizontal configuration. Such an evaporator behaves as a counter current heat-exchanger in which a contaminated feed is supplied at 1 with a temperature $T_1$, and is gradually heated to a temperature $T_2$ by flowing through heat-exchangers 5; 6 and 7, connected inside the evaporating compartments 4; 3 and 2 respectively. External heat is supplied to the system by means of heat-exchanger 8 in which feedwater is heated to a temperature $T_3$. Upon evaporation of a part of the water from each of the compartments 2; 3 and 4 heat is transferred by condensation of watervapor to the heat-exchangers 7; 6 and 5. The condensate is caught in troughs 11; 12 and 13. The non-evaporated water flows through throttling opening 14 and 15 respectively of compartments 2 to 3 and from compartment 3 to 4. With temperatures $T_4$ and $T_5$ flows the remaining feed water and the distillate finally leaves the system at 10 and 9 respectively.

If the throttling openings 14, 15 have fixed openings, difficulties may arise during starting up of the apparatus or if the production of distillate is reduced. These changes then may result in very serious changes in the level of the liquid in the various evaporating compartments, said changes causing variations in the quantities of liquid which pass through the throttling openings 14, 15.

Also a variation in the rate of evaporations between $T_3$-$T_4$, caused by a change in temperature $T_3$, which may easily be caused by a variation in the heat supply to the heat-exchanger 8, may vary the production of distillate. Changes in the level of the liquid in the evaporating compartments will require changes in the feed rate and thus changes in production of distillate.

FIG. 2 is a schematic drawing of a prior art vertical multistage expansion evaporator in which corresponding reference numbers relate to corresponding elements of the installation shown in FIG. 1. Heat exchangers 5, 6 and 7 are formed by vertical tubes 17 filled with a granular material. Contaminated feed water enters tubes 17 through orifices 16, at the lower ends thereof, from a pressurized reservoir 18 which is supplied through input conduit 1. Tubes 17 are filled with a granular material which during operation of the apparatus is kept fluidized by feed liquid. It was found that in this way a substantial increase of heat-transfer may be obtained, and consequentially an increased production per $m^2$ heat exchanging surface. The use of a fluidized bed in heat-exchangers 5, 6 and 7 causes only small variations in the speed of flow of the feed water through the tubes 17 which are admissible. If the velocities are too low, the fluidized granular material will fall to the bottom of the tubes, whereas at too high velocities the granular material will flow out of tubes 17.

In the system it is impossible to compensate for changes in the operating conditions. Such as for instance during starting up, or the varying of the heatsupply to heat-exchanger 8, or changes in the rate of flow of feed water through tubes 17. In order to keep the level of the liquid in the evaporating compatments 2, 3 and 4 within acceptable limits, other measures are required.

The problems demonstrated in the prior art shown in FIGS. 1 and 2 emphasize the need for better control of the liquid level in the evaporation compartments under varying operating conditions.

One possibility comes to mind which is to influence the throughflowing openings of the throttling openings by means of a floatsystem in each of the compartments. However, this presents the danger of contamination of the float systems so that this solution is not appreciated as desirable for practical applications. Another possibility comes to mind in which by means of bypass connections between the various compartments, with for instance built in water locks, an extra regulation of the level in the compartments may be obtained. However, in particular having evaporators with a great number of stages, and/or great capacity, it was found that such a solution gives rise to very expensive constructions. For such devices therefore a solution according to this invention is preferable.

The invention is illustrated in FIG. 3, in a vertical multistage expansion evaporator of the type shown in FIG. 2 in which valve mechanisms are provided between the evaporation compartments. Said valve mechanisms being connected to adjusting means, which may be operated from outside the evaporator.

As will be clear from the preceding, the construction according to the invention has in particular great advantages in expansion evaporators of the vertical type with heat-exchanger tubes which run vertically through the evaporating compartments, and which are filled with fluidisable granular material. This invention permits quick control of changes in the operating conditions by oening or closing the throttling openings, 19, 20, 21, by a simple, low cost mechanism. It will be clear that the invention in principle also is applicable to a horizontal multistage expansion evaporator, and that also many variations are possible in designing the valve mechanisms and the adjusting means.

The simplest construction may be obtained by a fixed connection of the several valves to a common reciprocating shaft as shown in FIG. 3. If extremely great variations in the operating conditions are to be expected it is possible to use multiple parallel valve systems as shown in FIG. 4. These multiple parallel systems may be operated independently from eachother from outside the evaporator, or may be coupled inside the evaporator one to the other and be driven collectively from the outside.

Instead of all adjusting means being fixedly connected to one single through-going shaft, it also is possible that the valve adjusting means consist of a multitude of co-axial shafts in which each of the shafts carries one or more valves as shown in FIG. 5. These co-axial shafts 25a, 25b then may have a common passage through the top evaporator wall. In this way it is possible to control the rate of flow of evaporation liquid between the various compartments independently. Many ways are possible to obtain the desired flow through the compartment openings or to shut some off. The simplest construction consists of valve mechanisms in which valve discs cooperate with valve seats. The valve shaft may pass through the top evaporation compartment wall and be surrounded by a flexible bellows, which will make it possible to transmit a driving movement in a gas-tight way through the compartment wall. Also, it is possible to realize the valve mechanisms as rotatable covers over arcuate slots as shown in FIGS. 6 and 7. It even is possible, even with all the valves fixed rigedly to one throughgoing shaft, to perform different adjustments for each of the passage openings. To that end the throughgoing shaft be designed in such a way that it may perform both a longitudinal and a rotational movement. Each movement varying the compartment openings in different proportions to each other. Such a design is shown in FIGS. 8 and 9.

In FIG. 3 one of the above described designs is illustrated schematically. Only the evaporation compartments are shown and the heat exchanger tubes are omitted for simplicity; whereas at the same time a much greater number of compartments is possible, as indicated by the broken lines. Next to the throttling openings 14; 15 and 15a further passage openings 19; 20 and 21 are present. These further passage openings may be shut off by means of valves 22; 23 and 24, which are connected to a shaft 25. The shaft 25 may be moved in up and downward directions as indicated.

The openings 14, 15, 15a may be omitted in any of the embodiments illustrated in FIGS. 3-5.

FIGS. 6 and 7 illustrate a rotating throttle valve for evaporation compartment passages such as 19, 20, 21 shown in FIGS. 3-5. Compartment floor plate 30 has a circular hole 32 in which is welded a short length of tube or pipe 34 which extends above and below plate 30. A disc 36 with a concentric, arcuate slot 38 is welded to the top of tube 34. Slot 38 is illustrated as subtending an arc of about 90°, but it could be more or less depending on the size and design of cooperating valve member 40.

Valve member 40 as shown here is a semi-circular disc attached to operating rotatable shaft 42. Shaft 42 passes through a hole 44 in disc 36 and extends down to the next throttle valve.

Valve member 40 is in close, sliding relation to disc 36 and the area of slot 38 that it covers determines the rate of flow through passage 34.

FIGS. 8 and 9 illustrate a throttle valve that utilizes both longitudinal and rotational movement to control the rate of flow of evaporation liquid from one compartment to another.

As in FIGS. 6 and 7, evaporation compartment floor plate 30, hole 32, tube 34 are the same.

An arcuate flange 46 concentric to and abutting tube 34 is welded to the top surface of plate 30. In plan view (FIG. 8) flange 46 subtends an arc of about 60°; although it could extend more or less according to design requirements.

A circular disc 48 having a diameter equal to the O.D. of tube 34 is attached to shaft 50 and has a sliding fit inside flange 46. Shaft 50 is centered in tube 34 by journals attached to the exterior structure but not shown; and the shaft can be rotated or moved up or down by appropriate actuating means not shown.

An arcuate flange 52 is welded to the bottom of disc 48 and has a sliding fit inside tube 34.

The space 54 between the top of tube 34 and the bottom of disc 48 provides a variable exit for the feed water. The vertical distance can be varied by raising or lowering disc 48, and the arcuate dimension of the opening 54 can be varied by rotating flange 52 with respect to the stationary flange 46.

I claim:

1. A vertical multistage expansion evaporator comprising contiguous vertically arranged evaporator compartments, said contiguous compartments having a common ceiling and floor, said common ceiling and floor defining a passage means therethrough to permit communication between contiguous compartments, each compartment further comprising a vertical separating wall extending partially the distance from said floor to said ceiling to form a section of said compartment to confine liquid therein and a vapor section, said liquid through said passage means being permitted to flow into a vapor space above the liquid of the compartment next below, flow control means for said liquid positioned at each passage means and adjusting means interconnecting said flow control means and extending through all ceilings of the compartments to outside said evaporator thereby adjusting from outside the compartments simultaneously by a single adjusting operation all flow control means, said adjusting means comprising a plurality of throughgoing coaxial shafts with flow control means connected thereto.

2. The evaporator according to claim 1, including vertically arranged heat-exchanger tubes extending only through the vapor sections, said tubes being filled with fluidizable granulate.

3. The evaporator according to claim 1, wherein said passage means comprise valve-seats.

4. The evaporator according to claim 1, wherein said passage means comprise rotatable valves.

5. The evaporator according to claim 1, wherein said throughgoing shafts moves both longitudinally and rotatably and carries a plurality of flow control means so that both movements vary further passage-openings in relatively different proportions.

* * * * *